United States Patent
Segawa et al.

(10) Patent No.: US 10,147,554 B2
(45) Date of Patent: Dec. 4, 2018

(54) ENERGY STORAGE DYE-SENSITIZED SOLAR CELL

(71) Applicant: The University of Tokyo, Tokyo (JP)

(72) Inventors: Hiroshi Segawa, Tokyo (JP); Mari Sasaki, Tokyo (JP); Takaya Kubo, Tokyo (JP); Satoshi Uchida, Tokyo (JP)

(73) Assignee: The University of Tokyo, Tokyo (JP)

( * ) Notice: Subject to any disclaimer, the term of this patent is extended or adjusted under 35 U.S.C. 154(b) by 0 days.

(21) Appl. No.: 15/038,197

(22) PCT Filed: Nov. 21, 2014

(86) PCT No.: PCT/JP2014/080893
§ 371 (c)(1),
(2) Date: Oct. 3, 2016

(87) PCT Pub. No.: WO2015/076367
PCT Pub. Date: May 28, 2015

(65) Prior Publication Data
US 2017/0018370 A1    Jan. 19, 2017

(30) Foreign Application Priority Data

Nov. 21, 2013 (JP) ................................ 2013-241082

(51) Int. Cl.
*H01G 9/20* (2006.01)
*G02F 1/15* (2006.01)
*G02F 1/155* (2006.01)

(52) U.S. Cl.
CPC ............. *H01G 9/2022* (2013.01); *G02F 1/15* (2013.01); *G02F 1/155* (2013.01); *Y02E 10/542* (2013.01)

(58) Field of Classification Search
CPC ....... G02F 1/155; G02F 1/542; H01G 9/2022; H01G 9/20
See application file for complete search history.

(56) References Cited

U.S. PATENT DOCUMENTS

| 4,118,546 A | 10/1978 | Witzke et al. |
| 2005/0199279 A1* | 9/2005 | Yoshimine ...... H01L 31/022425 136/251 |

(Continued)

FOREIGN PATENT DOCUMENTS

| JP | 2006172758 A | 6/2006 |
| JP | 2008177021 A | 7/2008 |

OTHER PUBLICATIONS

JP 2006-172758 A online machine translation, translated on Sep. 7, 2017.*

(Continued)

*Primary Examiner* — Golam Mowla
(74) *Attorney, Agent, or Firm* — Fox Rothschild LLP; Robert J. Sacco; Carol E. Thorstad-Forsyth (57) ABSTRACT

Provided is an energy storage dye-sensitized solar cell having a simple structure. An energy storage dye-sensitized solar cell of the present invention has a photoelectrode and a charge storage electrode on the same surface of a conductive substrate such that the photoelectrode and the charge storage electrode act as one electrode. Hence, the energy storage dye-sensitized solar cell comprises two electrodes: the above-described one electrode and a counter electrode covered with a catalyst, thus having a simple structure.

9 Claims, 8 Drawing Sheets

(56) References Cited

U.S. PATENT DOCUMENTS

| | | | | |
|---|---|---|---|---|
| 2006/0268493 A1* | 11/2006 | Miyasaka | ............ | H01G 9/2022 361/502 |
| 2010/0084006 A1* | 4/2010 | Shyu | ...................... | G04C 10/02 136/252 |
| 2010/0294335 A1* | 11/2010 | Huang | .............. | H01L 31/03762 136/244 |

OTHER PUBLICATIONS

International Search Report dated Dec. 16, 2014 of international application No. PCT/JP2014/08093.

* cited by examiner

ENERGY STORAGE DYE-SENSITIZED SOLAR CELL

TECHNICAL FIELD

The present invention relates to an energy storage dye-sensitized solar cell.

BACKGROUND ART

Solar cells, which convert sunlight into clean electric energy, have attracted attention for their environmental friendliness. Examples of known solar cells include silicon solar cells, which contain silicon such as monocrystalline silicon and polycrystalline silicon, and organic solar cells, which contain, for example, organic dyes or polymers to produce electromotive force. These solar cells are incapable of providing stable electric power because they cannot generate electricity at night or on cloudy days. For this reason, methods of using the solar cells in combination with secondary batteries have been studied in order to provide stable electric power.

For example, an energy storage dye-sensitized solar cell with a secondary battery function has been developed by utilizing the properties of dye-sensitized solar cells that the electricity generation is accompanied by an oxidation-reduction reaction (see Patent Literature 1, for example).

The Patent Literature 1 discloses a solar cell in which: an iodine electrolyte and an electrolyte containing lithium perchlorate are separated from each other by a cation exchange membrane; a photoanode, which is a porous electrode on which sensitized dyes are adsorbed, and a mesh counter electrode facing the photoanode are present in the iodine electrolyte; and a charge storage electrode is present in the electrolyte containing the lithium perchlorate.

CITATION LIST

Patent Literature

Patent Literature 1: Japanese Patent Laid-Open No. 2004-288985

SUMMARY OF INVENTION

Technical Problem

The solar cell disclosed in Patent Literature 1 includes the charge storage electrode in addition to the photoanode and the counter electrode, forming a three-electrode structure which is more complex than the structure of a dye-sensitized solar cell without a secondary battery function.

A charge status of the solar cell disclosed in Patent Literature 1 cannot be easily checked because checking the charge status thereof requires at least measurement of electrical characteristics.

In view of the above-described problems, the first object of the present invention is to provide an energy storage dye-sensitized solar cell with a simple structure. The second object of the present invention is to provide an energy storage dye-sensitized solar cell which enables checking the charge status easily.

Solution to Problem

An energy storage dye-sensitized solar cell according to an aspect of the present invention includes a conductive substrate having transparency, a photoelectrode formed on a surface of the conductive substrate; a counter electrode facing the conductive substrate; and a charge storage electrode facing the counter electrode. The charge storage electrode is formed on the surface of the conductive substrate and is covered with a cation exchange membrane.

An energy storage dye-sensitized solar cell according to another aspect of the present invention includes a first conductive substrate having transparency, a photoelectrode formed on a surface of the first conductive substrate; a counter electrode facing the first conductive substrate; a charge storage electrode facing the counter electrode; and a second conductive substrate. The charge storage electrode is formed on a surface of the second conductive substrate, and covered with a cation exchange membrane, and contains an electrochromic material.

Advantageous Effects of Invention

The energy storage dye-sensitized solar cell according to an aspect of the present invention has the photoelectrode and the charge storage electrode on the same surface of the conductive substrate such that the photoelectrode and the charge storage electrode act as one electrode. Hence, the energy storage dye-sensitized solar cell is comprised of two electrodes: the above-described one electrode and the counter electrode covered with the catalyst, and thus having a simple structure.

In the energy storage dye-sensitized solar cell according to another aspect of the present invention, the charge storage electrode contains the electrochromic material, so that the color of the electrochromic material and hence the color of the charge storage electrode change in response to (with the progress of) the oxidation or reduction in the charge storage electrode. As a result, the charge status is readily checked based on a change in the color of the charge storage electrode.

BRIEF DESCRIPTION OF DRAWINGS

FIGS. 2A to 2E show longitudinal sectional views illustrating the steps for manufacturing the energy storage dye-sensitized solar cell according to the first embodiment. Specifically.

FIGS. 4A to 4G show longitudinal sectional views illustrating the steps for manufacturing the energy storage dye-sensitized solar cell according to the second embodiment. Specifically.

DESCRIPTION OF EMBODIMENTS

Embodiments of the present invention will now be described with reference to the attached drawings.

1. First Embodiment (1) Structure of Energy Storage Dye-Sensitized Solar Cell

Figure 1:
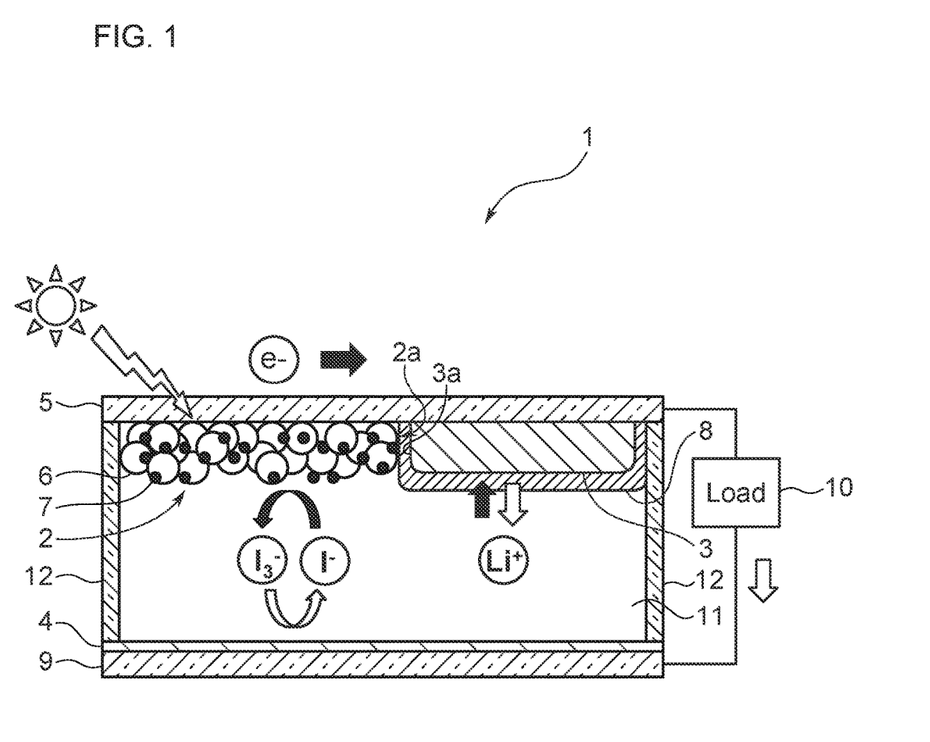
FIG. 1 is a schematic cross-sectional view illustrating the structure of an energy storage dye-sensitized solar cell according to a first embodiment.

An energy storage dye-sensitized solar cell 1 according to a first embodiment illustrated in FIG. 1 includes a photoelectrode 2, a charge storage electrode 3, and a counter electrode 9 covered with a catalyst 4. The photoelectrode 2 is formed on a surface of a conductive substrate 5. The charge storage electrode 3 is also formed on the surface of the conductive substrate 5. The counter electrode 9 faces the photoelectrode 2 and the charge storage electrode 3.

The photoelectrode 2 is composed of a dye adsorbed semiconductor 6, which supports a dye 7. The dye adsorbed semiconductor 6 is preferably a porous material having a large surface area. The dye adsorbed semiconductor 6 comprises at least one of titanium oxide, niobium oxide, zinc oxide, zirconium oxide, tantalum oxide, tin oxide, tungsten oxide, indium oxide, and gallium arsenide, for example. The dye adsorbed semiconductor 6 is a pile of particles comprising the above-described material(s). The particles of the photoelectrode 2 support (are loaded with) the dye 7.

The dye 7 absorbs light in at least one of the visible light region, the infrared light region, and the ultraviolet light region, and has an excitation photon energy higher than the band energy of the dye adsorbed semiconductor 6. Examples of the dye 7 include ruthenium-based dyes, porphyrin-based dyes, phthalocyanine-based dyes, rhodamine-based dyes, xanthene-based dyes, chlorophyll-based dyes, triphenylmethane-based dyes, acridine-based dyes, coumarin-based dyes, oxazine-based dyes, indigo-based dyes, cyanine-based dyes, merocyanine-based dyes, rhodacyanine-based dyes, eosin-based dyes, and mercurochrome-based dyes. In particular, preferred examples include ruthenium-bipyridyl complexes, such as ruthenium-tris(2,2'-bispyridyl-4,4' dicarboxylate), ruthenium-cis-dithiocyano-bis(2,2'-bipyridyl-4,4'-dicarboxylate), ruthenium-cis-diaqua-bis(2,2'-bipyridyl-4,4'-dicarboxylate), ruthenium-cyano-tris(2,2'-bipyridyl-4,4'-dicarboxylate), cis-(SCN)-bis(2,2'-bipyridyl-4,4'-dicarboxylate), and ruthenium.

On the surface of the conductive substrate 5, the charge storage electrode 3 is adjacent to (or in contact with) the photoelectrode 2 through the cation exchange membrane 8.

In this embodiment, the top surface (the bottom surface in the drawing) and side surfaces of the charge storage electrode 3 are covered with the cation exchange membrane 8. The cation exchange membrane 8 is formed between a side surface 2a of the photoelectrode 2 and a side surface 3a of the charge storage electrode 3. The cation exchange membrane 8 and the side surface 2a of the photoelectrode 2 are in contact with each other.

To accumulate electrons, which are generated by irradiation of the photoelectrode 2 with light, in the charge storage electrode 3, the oxidation reduction voltage (potential) of the charge storage electrode 3 needs to be more positive than the flatband voltage of the dye adsorbed semiconductor 6. To extract the electrons accumulated in the charge storage electrode 3, the oxidation reduction voltage of the charge storage electrode 3 needs to be more negative than the oxidation reduction voltages of reductant and oxidant in an electrolyte (described later).

The charge storage electrode 3 may contain an electrochromic material, the color of which changes in the visible light region in response to (with the progress of) oxidation-reduction reaction. The electrochromic material comprises, for example, an inorganic material or an organic material. The inorganic material is, for example, at least one of oxide, complex oxide, hydroxide, and nitride of an element selected from Ti, V, Mn, Fe, Co, Cr, Ni, Cu, Zr, Nb, Mo, Rh, In, W, and Ir. The organic material is, for example, at least one of polypyrroles, polyanilines, polythiophenes, polyacetylenes, polyphenylenes, polyphenylene vinylene, polyacenes, polyvinyl carbazole, polyviologens, polyporphyrins, polyphthalocyanines, polyferrocenes, and polyamines, the derivatives of these polymers, carbon nanotubes, fullerenes, and quinoline-containing polymers. Alternatively, the inorganic and organic materials may be used in combination. The cation exchange membrane 8 is, for example, Nafion (registered trademark) produced by DuPont or Selemion (registered trademark) produced by Asahi Glass. The cation exchange membrane 8 may be Flemion (registered trademark) or Gore-Tex (registered trademark).

The conductive substrate 5 is comprised of a substrate having transparency, which is made of, for example, glass or plastic, and a conductive film having transparency, which is on a surface of the substrate. Thus, the conductive substrate 5 has transparency. The photoelectrode 2 and the charge storage electrode 3 are formed on a surface of the conductive film. The conductive film comprises at least one material selected from tin oxide, zinc oxide, niobium oxide, tungsten oxide, indium oxide, zirconium oxide, tantalum oxide, tin-doped indium oxide (ITO), fluorine-doped tin oxide (FTO), or the like.

The counter electrode 9 is comprised of a substrate having transparency, which is made of, for example, glass or plastic, and a conductive film having transparency, which is on the surface of the substrate. A surface of the conductive film is covered with the catalyst 4.

The catalyst (layer) 4 contains a material that catalyzes the oxidation of the reductant and the reduction of the oxidant in the electrolyte (described later). The catalyst 4 contains, for example, platinum (Pt), gold (Au), silver (Ag), palladium (Pd), or carbon.

A spacer 12, which comprises resin such as HIMILAN (registered trademark) produced by Du Pont-Mitsui Polychemicals Co., Ltd., is disposed between the conductive substrate 5 and the counter electrode 9. An internal space 11 defined by the spacer 12, the conductive substrate 5, and the counter electrode 9 is sealed, and filled with the electrolyte.

The electrolyte is a solution containing a reductant, an oxidant, and cations. Examples of the electrolyte include a solution containing quinone and hydroquinone, a solution containing iodide ions and iodine, and a solution containing bromide ions and bromine. The cations are alkali metal ions such as lithium ions, or the like. A solvent that dissolves the above-described materials is used in the above-described solution. The examples of the solvent include acetonitrile, ethylene carbonate, propylene carbonate, methanol, ethanol, butanol, methoxypropionitrile, N-methyl-oxazolidinone, N-methylformamide, sulfolane, methoxy acetonitrile, dimethyl sulfoxide, dimethylformamide, and nitromethane.

(2) Method for Manufacturing Energy Storage Dye-Sensitized Solar Cell

Figure 2A:
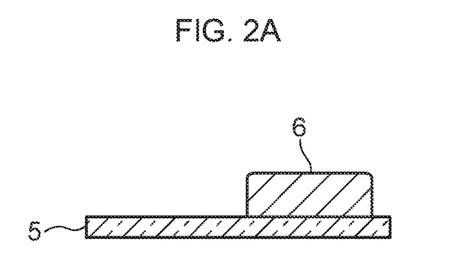
FIG. 2A illustrates a step in which a dye adsorbed semiconductor is formed.

A method for manufacturing the energy storage dye-sensitized solar cell 1 will now be described with reference to FIG. 2, in which the components corresponding to those in FIG. 1 are denoted by the same reference numerals as in FIG. 1. The dye adsorbed semiconductor 6 having a predetermined shape is first formed in a predetermined position on the surface of the conductive substrate 5 by screen printing (FIG. 2A).

Figure 2B:
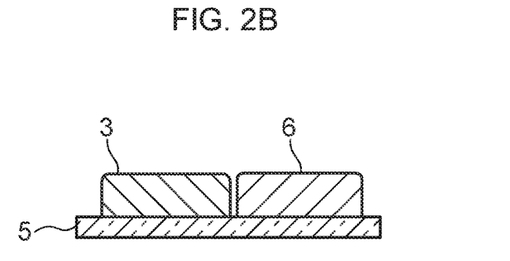
FIG. 2B illustrates a step in which a charge storage electrode is formed.

The charge storage electrode 3 having a predetermined shape is then formed by screen printing in a predetermined position on the surface of the conductive substrate 5, on which the dye adsorbed semiconductor 6 has been formed. There is a space between the charge storage electrode 3 and the dye adsorbed semiconductor 6 (FIG. 2B).

Figure 2C:
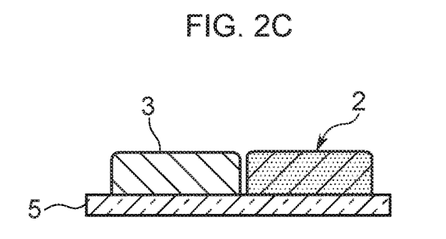
FIG. 2C illustrates a step in which a photoelectrode is formed.

The conductive substrate 5, on which the dye adsorbed semiconductor 6 and the charge storage electrode 3 have been formed, is then heated at a predetermined temperature for a predetermined time with the use of a hotplate, for example. The heated conductive substrate 5 is cooled to room temperature and then soaked in a solution, such as ethanol mixed with the dye 7, for a predetermined time. Subsequently, the conductive substrate 5 is taken out and dried so that the dye 7 is supported (adsorbed) on the dye adsorbed semiconductor 6. Thereby, the photoelectrode 2 is formed on the surface of the conductive substrate 5 (FIG. 2C).

Figure 2D:
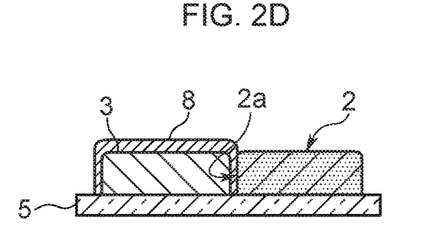
FIG. 2D illustrates a step in which a cation exchange membrane is formed.

Afterwards, a solution in which the raw material of the cation exchange membrane 8 is dissolved is applied to the surface of the charge storage electrode 3, which is on the surface of the conductive substrate 5, and dried at room temperature, and then heated at a predetermined temperature for a predetermined time. Thus, the top surface and the side surfaces of the charge storage electrode 3 are covered with the cation exchange membrane 8. The cation exchange membrane 8 is in contact with the side surface 2a of the photoelectrode 2. Subsequently, the conductive substrate 5 is soaked in an acetonitrile solution of lithium perchlorate for a predetermined time and thereby a treatment in which protons within the cation exchange membrane 8 and $Li^+$ are exchanged through the cation exchange membrane 8 is performed (FIG. 2D).

Figure 2E:
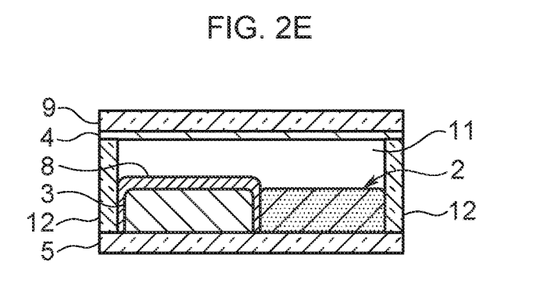
FIG. 2E illustrates a step in which an electrolyte is filled and thus the solar cell is completed.

The counter electrode 9, on which the catalyst (layer) 4 has been formed, and the conductive substrate 5, on which the charge storage electrode 3 covered with the cation exchange membrane 8 and the photoelectrode 2 have been formed, are bonded to each other through the spacer 12 by, for example, thermocompression. In this step, the internal space 11 defined by the conductive substrate 5, the counter electrode 9, and the spacer 12 is filled with the electrolyte, and then the conductive substrate 5 and the counter electrode 9 are bonded through the spacer 12 to seal the internal space 11 (FIG. 2E). Thus, the energy storage dye-sensitized solar cell 1 is manufactured.

(3) Actions and Advantageous Effects

The behavior of the energy storage dye-sensitized solar cell 1 during charging and discharging will now be described with reference to FIG. 1. The behavior during charging will be first described. As shown in FIG. 1, upon irradiation of the photoelectrode 2 with light, the dye 7 in the photoelectrode 2 is excited. Since the excited energy level of the dye 7 is higher than the energy level of the conduction band of the dye adsorbed semiconductor 6, electrons in the dye 7 are injected into the conduction band of the dye adsorbed semiconductor 6, and thereby the dye 7 is oxidized. After being injected into the conduction band of the dye adsorbed semiconductor 6, the electrons are conducted through the conduction band and the conductive substrate 5 to the charge storage electrode 3.

After reaching the charge storage electrode 3, the electrons react with the cations, which passed through the cation exchange membrane 8, and with the charge storage electrode 3, and then are accumulated in the charge storage electrode 3. For instance, with the use of $WO_3$ as the charge storage electrode 3 and $Li^+$ as the cations, the reaction $WO_3 + xLi^+ + xe^- \rightarrow Li_xWO_3$ occurs in the charge storage electrode 3. Thereby the reduction of the charge storage electrode 3 occurs, and the electrons are accumulated in the charge storage electrode 3. In the case where the charge storage electrode 3 contains an electrochromic material, the above-described reaction changes the color of the electrochromic material.

In the photoelectrode 2, the reductant and the dye 7 in the electrolyte react with each other, so that the dye 7 is reduced. Thereby the photoelectrode 2 returns to the state before the excitation of the dye 7. Concurrently, the reductant is oxidized into an oxidant.

This reaction is repeated and thereby the energy storage dye-sensitized solar cell 1 is charged. In the case where the charge storage electrode 3 contains an electrochromic material, the charging changes the color of the charge storage electrode 3.

The behavior during discharging will now be described. Referring to FIG. 1, in a case where an external load 10 is connected between the conductive substrate 5, on which the charge storage electrode 3 is formed, and the counter electrode 9, electrons and cations are produced in the charge storage electrode 3 due to the oxidation of the charge storage electrode 3. For instance, with the use of $WO_3$ as the charge storage electrode 3, and $Li^+$ as the cations, a reaction $Li_xWO_3 \rightarrow WO_3 + xLi^- + xe^-$ occurs in the charge storage electrode 3. In the case where the charge storage electrode 3 contains an electrochromic material, the above-described reaction changes the color of the electrochromic material.

The produced cations pass through the cation exchange membrane 8 and then are released into the electrolyte. The produced electrons are conducted through the conductive substrate 5 and then fed to the external load 10. After being fed to the external load 10, the electrons reach the counter electrode 9 covered with the catalyst 4. After reaching the counter electrode 9 covered with the catalyst 4, the electrons reduce the oxidant in the electrolyte. This reduction reaction converts the oxidant into a reductant. At this time, for example, Pt contained in the catalyst 4 acts as a catalyst.

This reaction is repeated and thereby the energy storage dye-sensitized solar cell 1 is discharged. In the case where the charge storage electrode 3 contains an electrochromic material, the discharging changes the color of the charge storage electrode 3.

In the above-described structure, the energy storage dye-sensitized solar cell 1 according to this embodiment has the charge storage electrode 3 and the photoelectrode 2 on the same surface of the conductive substrate 5 such that the charge storage electrode 3 and the photoelectrode 2 act as one electrode. Hence, the energy storage dye-sensitized solar cell 1 comprises two electrodes: the above-described one electrode and the counter electrode 9 covered with the catalyst 4, and thus having a simple structure.

With the use of the charge storage electrode 3, which contains an electrochromic material, formed on the surface of the conductive substrate 5 having transparency, the color of the electrochromic material and hence the color of the charge storage electrode 3 change in response to (with the progress of) the oxidation or reduction in the charge storage electrode 3. As a result, the charge status is readily checked based on a change in the color of the charge storage electrode 3.

Moreover, since the photoelectrode 2 and the charge storage electrode 3 are formed on the same surface of the conductive substrate 5 having transparency, the charge status can be checked through the light-receiving face of the conductive substrate 5 during charging.

The conductive substrate 5 and the counter electrode 9, both of which have transparency, allow the charge status to be checked also through the counter electrode 9.

2. Second Embodiment (1) Structure of Energy Storage Dye-Sensitized Solar Cell An energy storage dye-sensitized solar cell 13 according to a second embodiment will now be described with reference to FIG. 3, in which the components corresponding to those in FIG. 1 are denoted by the same reference numerals as in FIG. 1. The energy storage dye sensitizing solar cell 13 differs from that of the first embodiment in that the energy storage dye sensitizing solar cell 13 has a charge collector 14 on the surface of the conductive substrate 5. Aside from that, the energy storage dye sensitizing solar cell 13 has the same or similar structure as the first embodiment and the description thereof will be omitted.

Figure 3:
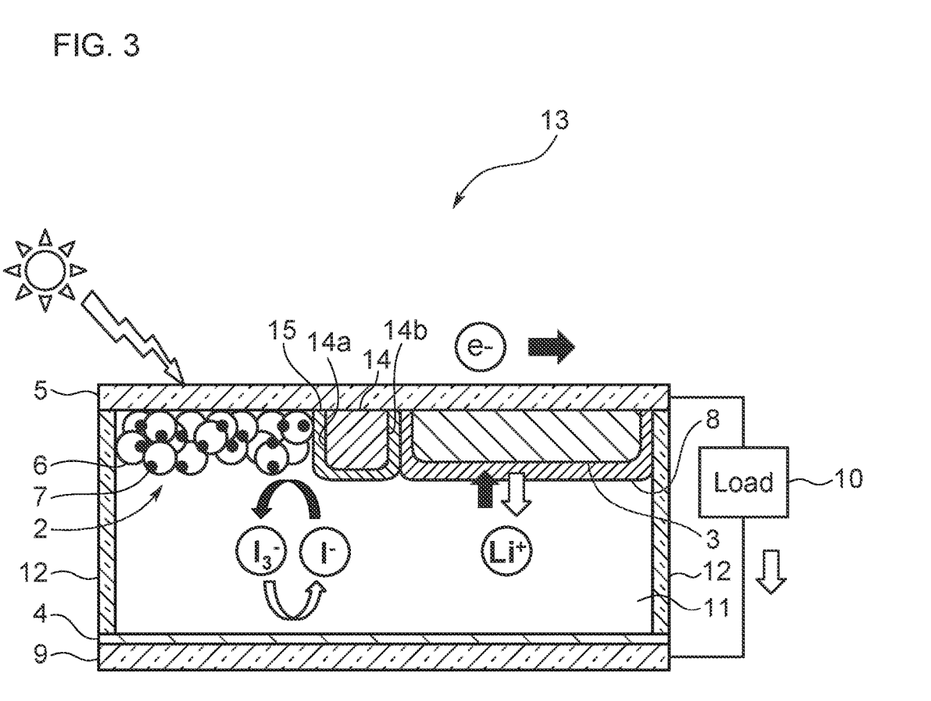
FIG. 3 is a schematic cross-sectional view illustrating the structure of an energy storage dye-sensitized solar cell according to a second embodiment.

As shown in FIG. 3, the photoelectrode 2, the charge storage electrode 3, and the charge collector 14 are formed on the surface of the conductive substrate 5 of the energy storage dye-sensitized solar cell 13. The charge collector 14 is formed between the photoelectrode 2 and the charge storage electrode 3, and is covered with a protective film 15. On the surface of the conductive substrate 5, one side surface 14a of the charge collector 14 is adjacent to (or in contact with) the photoelectrode 2 through the protective film 15 and the other side surface 14b is adjacent to (or in contact with) the cation exchange membrane 8 of the charge storage electrode 3 through the protective film 15. The charge collector 14 is made of, for example, a conductive metal, such as Ag, Au, Cu, Pt, or Al. The protective film 15 is made of, for example, glass, an inorganic insulating material, a polyolefin, or a thermoplastic resin.

(2) Method for Manufacturing Energy Storage Dye-Sensitized Solar Cell

Figure 4A:
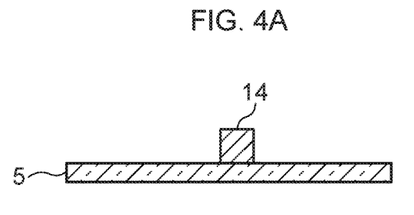
FIG. 4A illustrates the step in which a charge collector is formed.

A method for manufacturing the energy storage dye-sensitized solar cell 13 will now be described with reference to FIG. 4, in which the components corresponding to those in FIG. 3 are denoted by the same reference numerals as in FIG. 3. First, the charge collector 14 having a predetermined shape is formed by screen printing in a predetermined position on the surface of the conductive substrate 5 (FIG. 4A).

Figure 4B:
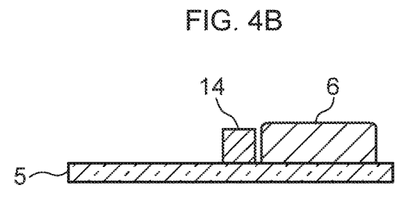
FIG. 4B illustrates the step in which a dye adsorbed semiconductor is formed.

The dye adsorbed semiconductor 6 having a predetermined shape is then formed by screen printing in a predetermined position on the surface of the conductive substrate 5, on which the charge collector 14 has been formed. There is a space between the dye adsorbed semiconductor 6 and the charge collector 14 (FIG. 4B).

Figure 4C:
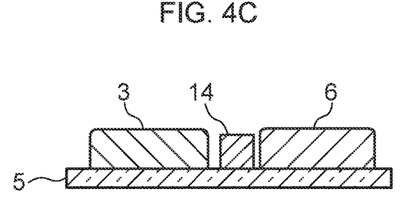
FIG. 4C illustrates the step in which a charge storage electrode is formed.

The charge storage electrode 3 is then formed in a predetermined position on the surface of conductive substrate 5, on which the charge collector 14 and the dye adsorbed semiconductor 6 has been formed. There is a space between the charge storage electrode 3 and the charge collector 14 (FIG. 4C).

Figure 4D:
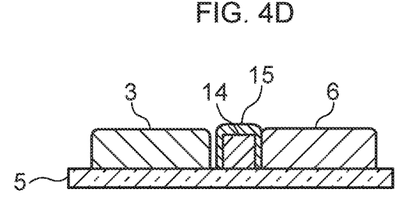
FIG. 4D illustrates the step in which a protective film is formed.

The protective film 15 is then formed on the surface of the charge collector 14. The protective film 15 is formed by screen printing or any other technique so that the protective film 15 comes in contact with the dye adsorbed semiconductor 6 (FIG. 4D).

Figure 4E:
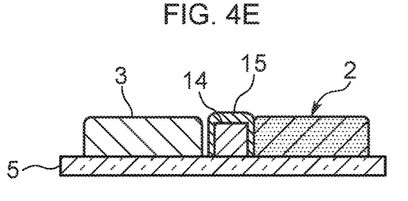
FIG. 4E illustrates the step in which a photoelectrode is formed.

Subsequently, in the same manner as the first embodiment, the dye 7 is supported (adsorbed) on the dye adsorbed semiconductor 6, which is formed on the surface of the conductive substrate 5. Thus the photoelectrode 2 is formed (FIG. 4E).

Figure 4F:
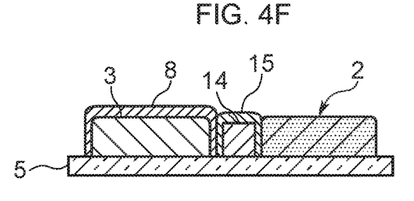
FIG. 4F illustrates the step in which a cation exchange membrane is formed.

Subsequently, in the same manner as the first embodiment, the cation exchange membrane 8 is formed on the surface of the charge storage electrode 3. The cation exchange membrane 8 is formed to be in contact with the protective film 15 (FIG. 4F).

Figure 4G:
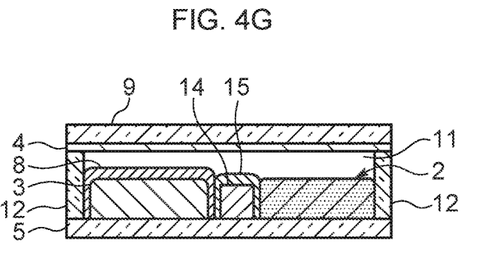
FIG. 4G illustrates the step in which an electrolyte is filled and thus the solar cell is completed.

Finally, the counter electrode 9, on which the catalyst (layer) 4 is formed, and the conductive substrate 5 are bonded to each other by, for example, thermocompression with the spacer 12 between the counter electrode 9 and the conductive substrate 5. In this step, the internal space 11 defined by the conductive substrate 5, the counter electrode 9, and the spacer 12 is filled with the electrolyte before the conductive substrate 5 and the counter electrode 9 are bonded to seal the internal space 11 (FIG. 4G). Thus, the energy storage dye-sensitized solar cell 13 is manufactured.

(3) Actions and Advantageous Effects

The energy storage dye-sensitized solar cell 13 according to the second embodiment, which has both the photoelectrode 2 and the charge storage electrode 3 on the same surface of the conductive substrate 5, behaves in the manner similar to the energy storage dye-sensitized solar cell 1 according to the first embodiment and achieves the similar advantageous effects as the energy storage dye-sensitized solar cell 1 according to the first embodiment.

The charge storage electrode 3, which contains an electrochromic material, is formed on the surface of the conductive substrate 5 having transparency. The color of the electrochromic material and hence the color of the charge storage electrode 3 change in response to (with the progress of) the oxidation or reduction in the charge storage electrode 3. As a result, the charge status is readily checked based on a change in the color of the charge storage electrode 3.

The charge collector 14, which is disposed between the photoelectrode 2 and the charge storage electrode 3, increases the conductivity of the conductive substrate 5, and thus increasing the efficiency of energy storage.

3. Third Embodiment (1) Structure of Energy Storage Dye-Sensitized Solar Cell An energy storage dye-sensitized solar cell 16 according to a third embodiment will now be described with reference to FIG. 5, in which the components corresponding to those in FIG. 1 are denoted by the same reference numerals as in FIG. 1. The energy storage dye-sensitized solar cell 16 differs from that of the first embodiment in that the energy storage dye-sensitized solar cell 16 has the photoelectrode 2 and the charge storage electrode 3 on different substrates and has a counter electrode 17 formed in the internal space 11. Thus the energy storage dye-sensitized solar cell 16 has a three-electrode structure. Aside from that, the energy storage dye-sensitized solar cell 16 has the same or similar structure as that of the first embodiment and the description thereof will be omitted.

Figure 5:
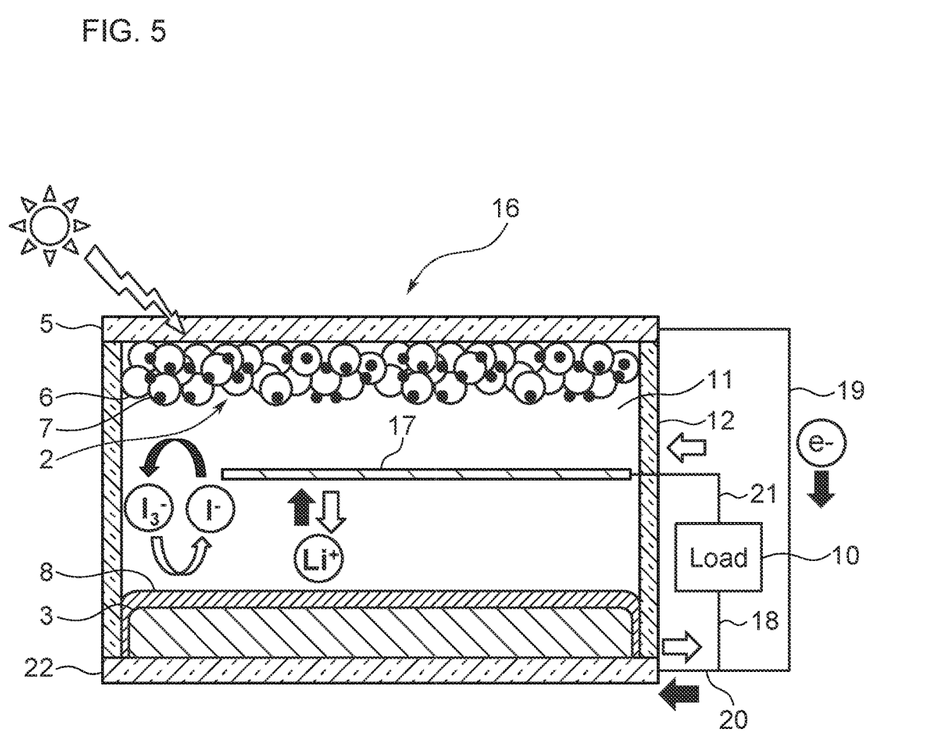
FIG. 5 is a schematic cross-sectional view illustrating the structure of an energy storage dye-sensitized solar cell according to a third embodiment.

As shown in FIG. 5, the energy storage dye-sensitized solar cell 16 has the photoelectrode 2 formed on the surface of the conductive substrate 5. The charge storage electrode 3 containing an electrochromic material is formed on a surface of a conductive substrate 22 that faces the conductive substrate 5. The conductive substrate 22 is comprised of a substrate having transparency and a conductive layer having transparency. The charge storage electrode 3 is formed on a surface of the conductive layer.

The counter electrode 17 is made of a material that catalyzes the oxidation of the reductant and the reduction of the oxidant in the electrolyte. For example, the counter electrode 17 is made of Pt and has a mesh shape. The counter electrode 17 is disposed in the internal space 11 between the photoelectrode 2 and the charge storage electrode 3 such that a mesh surface of the counter electrode 17 is substantially parallel with the surface of the conductive substrate 5. The counter electrode 17 faces the photoelectrode 2 and the charge storage electrode 3. The counter electrode 17 may be a gold mesh, a silver mesh, a carbon mesh, a palladium mesh, or porous diamond, for example.

(2) Actions and Advantageous Effects

The behavior of the energy storage dye-sensitized solar cell 16 during charging and discharging will now be described with reference to FIG. 5. The behavior during charging will be first described. As shown in FIG. 5, upon irradiation of the photoelectrode 2 with light, the dye 7 in the photoelectrode 2 is excited. Since the excited energy level of the dye 7 is higher than the energy level of the conduction band of the dye adsorbed semiconductor 6, electrons in the dye 7 are injected into the conduction band of the dye adsorbed semiconductor 6, and thereby the dye 7 is oxidized. After being injected into the conduction band of the dye adsorbed semiconductor 6, the electrons are conducted through the conduction band, the conductive substrate 5, conductors 19 and 20, and the conductive substrate 22 to the charge storage electrode 3.

After reaching the charge storage electrode 3, the electrons react with the cations, which passed through the cation exchange membrane 8, and with the electrochromic material contained in the charge storage electrode 3, and then are accumulated in the charge storage electrode 3. In other words, the electrochromic material is reduced and the electrons are accumulated in the charge storage electrode 3. This reaction changes the color of the electrochromic material.

In the photoelectrode 2, the reductant in the electrolyte and the dye 7 react with each other, so that the dye 7 is reduced. Thereby, the photoelectrode 2 returns to the state before the excitation. Concurrently, the reductant is oxidized into an oxidant.

This reaction is repeated and thereby the energy storage dye-sensitized solar cell 16 is charged and the color of the charge storage electrode 3 is changed.

The behavior during discharging will be described. Referring to FIG. 5, in a case where the external load 10 is connected between the conductive substrate 22, on which the charge storage electrode 3 is formed, and the counter electrode 17, electrons and cations are produced in the charge storage electrode 3 due to the oxidation of the electrochromic material. This reaction changes the color of the electrochromic material. The produced cations pass through the cation exchange membrane 8 and then are released into the electrolyte. The produced electrons are conducted through the conductive substrate 22 and the conductors 20 and 18, and then fed to the external load 10. After being fed to the external load 10, the electrons are conducted through the external load 10 and the conductor 21 to the counter electrode 17. After reaching the counter electrode 17, the electrons reduce the oxidant in the electrolyte. This reduction reaction converts the oxidant into a reductant. At this time, for example, Pt contained in the counter electrode 17 acts as a catalyst.

This reaction is repeated and thereby the energy storage dye-sensitized solar cell 16 is discharged and the color of the charge storage electrode 3 is changed.

In the above-described structure, the charge storage electrode 3 contains the electrochromic material, so that the color of the electrochromic material and hence the color of the charge storage electrode 3 change in response to (with the progress of) the oxidation or reduction in the charge storage electrode 3. As a result, the charge status is readily checked based on a change in the color of the charge storage electrode 3.

Since the charge storage electrode 3 is formed on the surface of the conductive substrate 22 having transparency, the charge status is checked through the conductive substrate 22.

4. Examples (1) Shape of Energy Storage Dye-Sensitized Solar Cell

In Example 1, an energy storage dye-sensitized solar cell according to the first embodiment was fabricated. In Example 2, an energy storage dye-sensitized solar cell according to the second embodiment was fabricated.

Figure 6A:
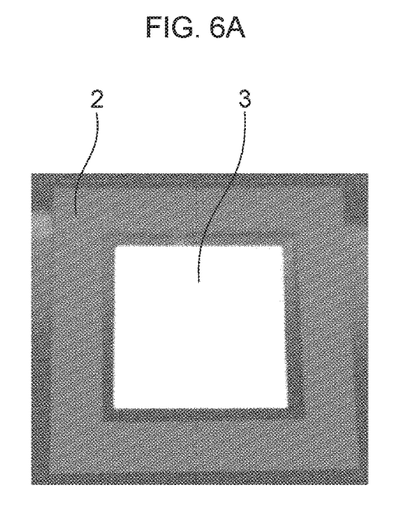
FIG. 6A is a photograph of the top face of an energy storage dye-sensitized solar cell of Example 1 and FIG. 6B is a photograph of the top face of an energy storage dye-sensitized solar cell of Example 2.

As shown in FIG. 6A, the energy storage dye-sensitized solar cell of Example 1 (hereinafter referred to as "solar cell of Example 1") has a photoelectrode 2, which has a hollow square shape, and an approximate quadrilateral-shaped charge storage electrode 3 inside the photoelectrode 2. The solar cell of Example 1 was fabricated with the above-described manufacturing method using the following: $TiO_2$ which supports a Ru complex dye, as the photoelectrode 2; $WO_3$ as the charge storage electrode 3; Pt as a catalyst 4; Nafion (registered trademark) as a cation exchange membrane 8; acetonitrile containing $I^-$, $I_3^-$, and $Li^+$, as an electrolyte; a glass substrate having a surface on which FTO is formed, as a conductive substrate 5; and a glass substrate having a surface on which ITO is formed, as a counter electrode 9.

Figure 6B:
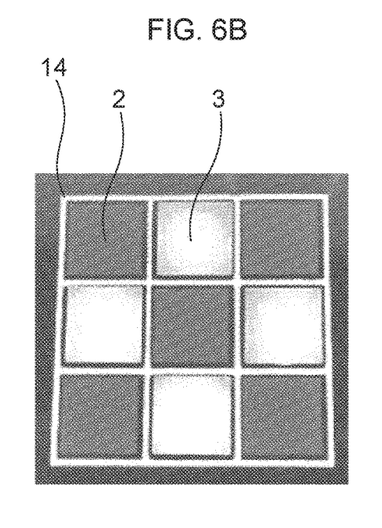

As shown in FIG. 6B, the energy storage dye-sensitized solar cell of Example 2 (hereinafter referred to as "solar cell of Example 2") has a grid-shaped charge collector 14, and quadrilateral-shaped photoelectrodes 2 and quadrilateral-shaped charge storage electrodes 3 arranged inside the grid. The photoelectrodes 2 and the charge storage electrodes 3 are disposed alternately. The solar cell of Example 2 was fabricated with the above-described manufacturing method using the following: $TiO_2$ which supports a Ru complex dye, as the photoelectrode 2; $WO_3$ as the charge storage electrode 3; Pt as a catalyst 4; Nafion as a cation exchange membrane 8; Ag as the charge collector 14; a protective film 15; acetonitrile containing $I^-$, $I_3^-$, and $Li^+$, as an electrolyte; a glass substrate having a surface on which FTO is formed, as a conductive substrate 5; and a glass substrate having a surface on which ITO is formed, as a counter electrode 9.

(2) Evaluation of Characteristics of Energy Storage Dye-Sensitized Solar Cell

Figure 7:
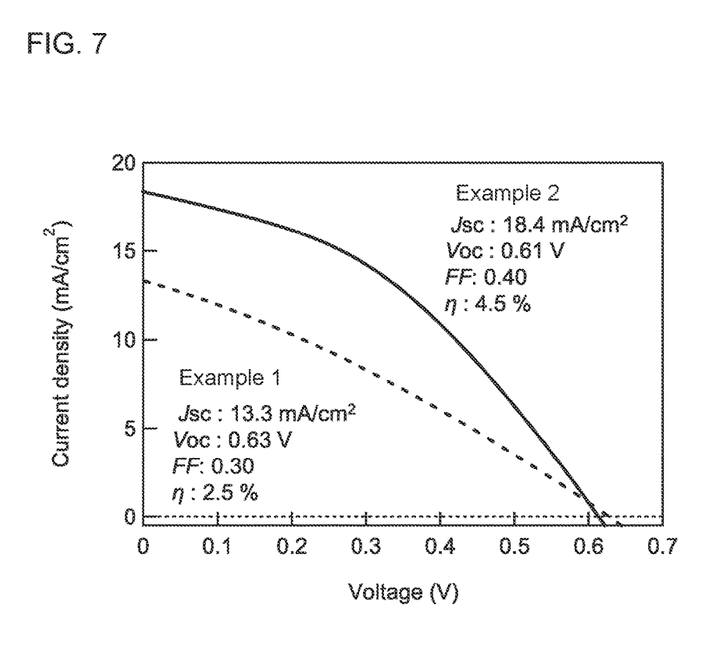
FIG. 7 illustrates the current-voltage characteristics of the energy storage dye-sensitized solar cells of the Examples.

The current-voltage characteristics of the solar cell of Example 1 and the solar cell of Example 2 were measured. The short circuit current density Jsc and the open circuit voltage Voc were determined from the measurement of the current-voltage characteristics, and then the fill factor FF and the conversion efficiency η were calculated from the calculated values of Jsc and Voc. The results are shown in FIG. 7. In FIG. 7, the vertical axis indicates current density and the horizontal axis indicates voltage. The conversion efficiency η of the solar cell of Example 1 was 2.5% and the conversion efficiency η of the solar cell of Example 2 was 4.5%. Thus, it was confirmed that the solar cell of Example 1 and the solar cell of Example 2 have power-generating capabilities.

Figure 8:
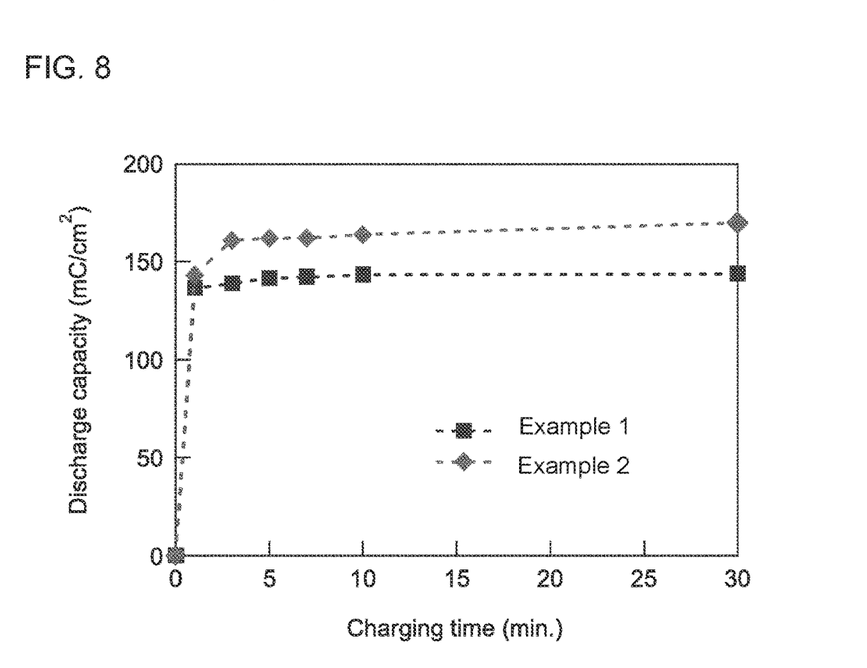
FIG. 8 illustrates the charging characteristics of the energy storage dye-sensitized solar cells of the Examples.

The charging performances of the solar cells of Example 1 and Example 2 were then evaluated. Discharged solar cells were irradiated with light from a solar simulator, which was used as a light source, and changes in the amounts of charge in the solar cells with respect to the time elapsed from the start of the irradiation were measured. The results are shown in FIG. 8. In FIG. 8, the vertical axis indicates the amount of charge in the solar cells. The horizontal axis indicates a time period (irradiation time) of the irradiation of the solar cells with light. The drawing shows that in each of the solar cell of Example 1 and the solar cell of Example 2, the amount of charge increased with the irradiation time and became almost saturated at a lapse of five minutes. The results confirmed that the solar cell of Example 1 and the solar cell of Example 2 are charged by the irradiation with light.

Figure 9:
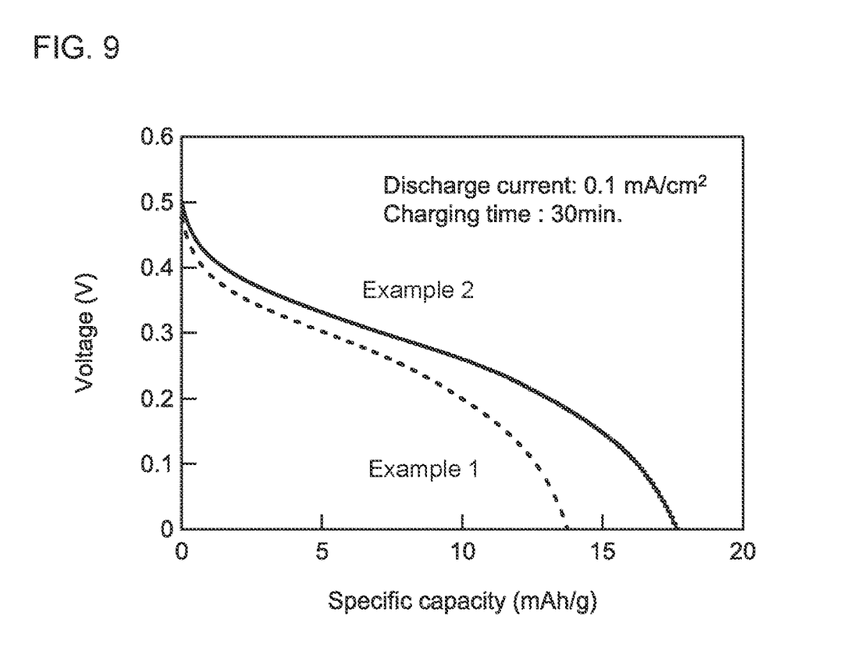
FIG. 9 illustrates the discharging characteristics of the energy storage dye-sensitized solar cells of the Examples.

Subsequently, in order to evaluate discharging performance, the charged solar cell of Example 1 and the charged solar cell of Example 2 were connected to loads, respectively, and discharged at a current density of 0.1 mA/cm$^2$, and changes in the output voltage of each solar cell with respect to the time elapsed from the start of discharging were measured. Note that the solar cell of Example 1 and the solar cell of Example 2 were charged by 30 minutes of irradiation with light from a solar simulator, which was used as a light source. The results are shown in FIG. 9. In FIG. 9, the vertical axis indicates the output voltage of the solar cell and the horizontal axis indicates discharged capacity, i.e. the product of the time elapsed from the start of discharging and the current at discharging. The results confirmed that the solar cell of Example 1 and the solar cell of Example 2 are discharged with the loads connected.

Figure 10:
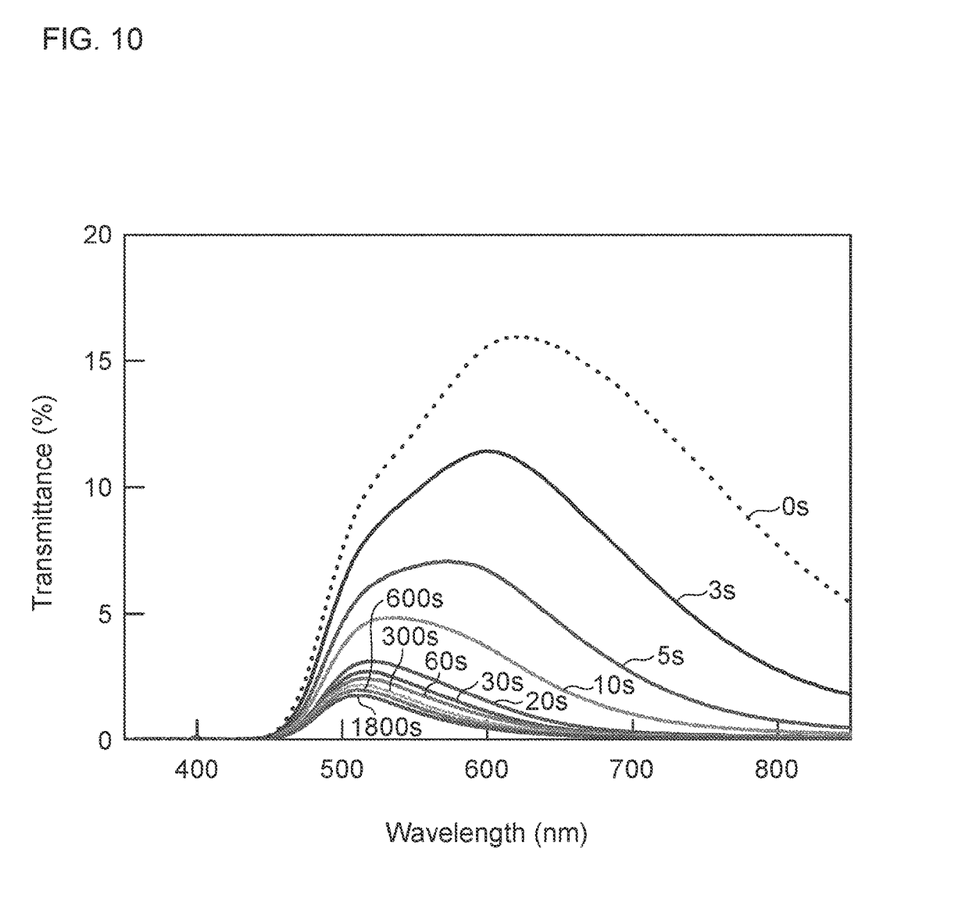
FIG. 10 illustrates the transmittance characteristics of the charge storage electrode in the energy storage dye-sensitized solar cell of Example 2.

Finally, changes in the color of the charge storage electrode 3 in the solar cell of Example 2 during charging were evaluated. The discharged solar cell of Example 2 was charged by the irradiation with light from a solar simulator, which was used as a light source, and changes in the transmittance of the charge storage electrode 3 with respect to the time elapsed from the start of charging were measured. The results are shown in FIG. 10. In FIG. 10, the vertical axis indicates transmittance and the horizontal axis indicates the wavelengths of transmitted light. FIG. 10 shows that the transmittance decreases as the charging time increases. The results show that the color of the charge storage electrode 3 changes with the charging time. It was therefore confirmed that the charge status is checked based on a change in the color of the charge storage electrode 3.

5. Modification

The present invention is not limited to the above embodiments and can be modified as appropriate without departing from the spirit of the present invention.

The first embodiment has been described based on the case where the counter electrode 9 comprises a substrate having transparency. This is not necessarily the case in the present invention and the substrate of the counter electrode 9 does not necessarily have transparency.

The above embodiments use a glass substrate having a surface on which a conductive film (layer) having transparency is formed, for each of the conductive substrates 5 and 22 and the counter electrode 9. This is not necessarily the case in the present invention. A substrate that has transparency and conductivity may be used for each of the conductive substrates 5 and 22 and the counter electrode 9.

The above embodiments have been described based on the case where a single electrochromic material is contained in the charge storage electrode 3. This is not necessarily the case in the present invention. The charge storage electrode 3 may have a plurality of separate regions containing different respective electrochromic materials, to provide a plurality of colors in the charge storage electrode 3.

The third embodiment has been described based on the case where the charge storage electrode 3 is formed on the surface of the conductive substrate 22 having transparency. This is not necessarily the case in the present invention and the conductive substrate 22 does not necessarily have transparency. In this case, a portion of the conductive substrate 5 is not formed with the photoelectrode 2, so that the charge status of the energy storage dye-sensitized solar cell 16 is checked through the light-receiving face of the conductive substrate 5.

REFERENCE SIGNS LIST 1, 13, 16 energy storage dye-sensitized solar cell
2 photoelectrode
3 charge storage electrode
4 catalyst
5, 22 conductive substrate
6 dye adsorbed semiconductor
7 dye
8 cation exchange membrane
9, 17 counter electrode
10 external load
11 internal space
12 spacer
14 charge collector
15 protective film
18, 19, 20, 21 conductor

The invention claimed is:

1. An energy storage dye-sensitized solar cell comprising:
a conductive substrate having transparency;
a photoelectrode formed on a surface of the conductive substrate;
a counter electrode facing the conductive substrate;
an electrolyte filled in a space between the conductive substrate and the counter electrode, the electrolyte being a solution containing a reductant, an oxidant and cations; and
a charge storage electrode facing the counter electrode, the charge storage electrode being formed on the surface of the conductive substrate, the charge storage electrode being electrically connected to the photoelectrode through the conductive substrate, the charge storage electrode being covered with a cation exchange membrane through which cations pass, wherein
the photoelectrode is disposed in the electrolyte so as to be in contact with the electrolyte, the charge storage electrode is disposed in the electrolyte through the cation exchange membrane, and the conductive substrate and the counter electrode are configured such that an external load is connected between the conductive substrate and the counter electrode during discharging.

2. The energy storage dye-sensitized solar cell according to claim 1, wherein a charge collector is disposed between the photoelectrode and the charge storage electrode.

3. The energy storage dye-sensitized solar cell according to claim 2, wherein a surface of the charge collector is covered with a protective film.

4. The energy storage dye-sensitized solar cell according to claim 1, wherein the charge storage electrode contains an electrochromic material.

5. The energy storage dye-sensitized solar cell according to claim 4, wherein the electrochromic material comprises at least one of an oxide, a complex oxide, a hydroxide, and a nitride of an element selected from Ti, V, Mn, Fe, Co, Cr, Ni, Cu, Zr, Nb, Mo, Rh, In, W, and Ir.

6. The energy storage dye-sensitized solar cell according to claim 1, wherein the photoelectrode and the charge storage electrode are on the surface of the conductive substrate and are adjacent to each other through the cation exchange membrane.

7. The energy storage dye-sensitized solar cell according to claim 1, wherein a charge collector is disposed between the photoelectrode and the charge storage electrode on the surface of the conductive substrate in a grid pattern, and the photoelectrode and the charge storage electrode are arranged alternately inside the grid.

8. The energy storage dye-sensitized solar cell according to claim 4, wherein the charge storage electrode has a plurality of separate regions containing different respective electrochromic materials.

9. The energy storage dye-sensitized solar cell according to claim 1, wherein the electrolyte is a solution containing quinone, hydroquinone and alkali metal ions, a solution containing iodide ions, iodine and alkali metal ions, or a solution containing bromide ions, bromine and alkali metal ions.

* * * * *